United States Patent
Karhu

(10) Patent No.: US 7,379,958 B2
(45) Date of Patent: May 27, 2008

(54) AUTOMATIC AND DYNAMIC SERVICE INFORMATION DELIVERY FROM SERVICE PROVIDERS TO DATA TERMINALS IN AN ACCESS POINT NETWORK

(75) Inventor: Mika Karhu, Tampere (FI)

(73) Assignee: Nokia Corporation, Espoo (FI)

( * ) Notice: Subject to any disclaimer, the term of this patent is extended or adjusted under 35 U.S.C. 154(b) by 955 days.

(21) Appl. No.: 10/334,449

(22) Filed: Dec. 30, 2002

(65) Prior Publication Data

US 2004/0199616 A1    Oct. 7, 2004

(51) Int. Cl.
*G06F 15/16* (2006.01)
*G06F 15/173* (2006.01)
*H04Q 7/20* (2006.01)

(52) U.S. Cl. ............... 709/201; 709/243; 455/456.1

(58) Field of Classification Search .......... 709/201, 709/230, 243; 455/456.1, 456.2, 456.3
See application file for complete search history.

(56) References Cited

U.S. PATENT DOCUMENTS

| | | | | |
|---|---|---|---|---|
| 6,748,195 | B1* | 6/2004 | Phillips | 455/41.2 |
| 7,103,313 | B2* | 9/2006 | Heinonen et al. | 455/41.2 |
| 7,224,979 | B2* | 5/2007 | Singhal et al. | 455/456.1 |
| 2001/0044746 | A1* | 11/2001 | Oki | 705/14 |
| 2001/0055976 | A1* | 12/2001 | Crouch et al. | 455/456 |
| 2002/0052966 | A1* | 5/2002 | Isomura et al. | 709/230 |
| 2002/0085719 | A1* | 7/2002 | Crosbie | 380/248 |
| 2002/0132605 | A1* | 9/2002 | Smeets et al. | 455/411 |
| 2003/0022667 | A1* | 1/2003 | Kim | 455/426 |
| 2003/0058808 | A1* | 3/2003 | Eaton et al. | 370/310 |
| 2004/0014422 | A1* | 1/2004 | Kallio | 455/41.1 |

FOREIGN PATENT DOCUMENTS

| | | |
|---|---|---|
| WO | WO 00/69186 | 11/2000 |
| WO | WO 01/97458 A1 | 12/2001 |
| WO | WO 01/97464 A1 | 12/2001 |
| WO | WO 02/43333 A2 | 5/2002 |

OTHER PUBLICATIONS

U.S. Appl. No. 10/286,638, filed Nov. 1, 2002, Mika Karhu et al.
European Search Report and Annex thereto for EP Application No. 03024533.6-1249, Date of Completion of Search—Mar. 15, 2004.
J. Veizades, et al. "Service Location Protocol", Network Working Group, RFC 2165, Jun. 1997, pp. 1-68.
"SLP White Paper Topic", http://playground.sun.com/srvloc/slp_white_paper.html, pp. 1-8, printed on Dec. 16, 2004.

(Continued)

*Primary Examiner*—Kenny S Lin
(74) *Attorney, Agent, or Firm*—Morgan & Finnegan, L.L.P.

(57) ABSTRACT

A system and method for dynamically updating service information from a service provider to a data terminal in an access point network wherein an access point requests service information from a local server; in response, the access point receives service information from the local server. Subsequently, the access point maps the service information to a link-level communication Service Discovery Protocol (SDP). The access point then sends the mapped service information to a data terminal.

44 Claims, 6 Drawing Sheets

100

OTHER PUBLICATIONS

"OpenSLP", http://www.openslp.org, pp. 1-3, printed on Dec. 16, 2004.

Dabrowski, Christopher, et al."Understanding Consistency Maintenance in Service Discovery Architectures in Response to Message Loss." AMS'02, Jul. 23, 2002, pp. 1-10.

Bettstetter, Christian, et al. "A Comparison of Service Discovery Protocols and Implementation of the Service Location Protocol." EUNICE—Open European Summer School, Sep. 13, 2000, pp. 1-8.

European Search Report and Annex thereto for EP Application No. 03029934, Date of Completion of Search—Jun. 21, 2004.

* cited by examiner

| Registered Service 410 | |
|---|---|
| URL | Service:WoB:http://www.fi/wap.html |
| LIFETIME | 100 |
| SCOPE-LIST | access zone 1 |
| LANG.TAG | EN |
| ATTRIBUTES | (DESCRIPTION=WAP service), (WAPGWIP=10.0.0.1), (NAME=WoB), (OPERATOR = Nokia) |
| | |
| Registered Service 420 | |
| URL | Service:printer:lpr://www.fi/printer |
| LIFETIME | 1000 |
| SCOPE-LIST | access zone 2 |
| LANG.TAG | FI |
| ATTRIBUTES | (DESCRIPTION=Color printer), (NAME=HP laser jet), (OPERATOR = Nokia) |
| | |
| Service Request 430 | |
| SCOPE-LIST | access zone 1 |
| | |
| Service Reply 440 | |
| URL | Service:WoB:http://www.fi/wap.html |
| LIFETIME | 100 |
| | |
| Service Attribute Request 450 | |
| URL | Service:WoB:http://www.fi/wap.html |
| SCOPE-LIST | access zone 1 |
| TAG-LIST | DESCRIPTION, WAPGWIP, NAME, OPERATOR |
| | |
| Service Attribute Response 460 | |
| ATTRIBUTES | (DESCRIPTION=WAP service), (WAPGWIP=10.0.0.1), (NAME=WoB), (OPERATOR=Nokia) |

| SLP | 500 | SDP | 510 | MAPPED SDP | 520 |
|---|---|---|---|---|---|
| NAME | | ServiceName | | WoB | |
| DESCRIPTION | | ServiceDescription | | WAP service | |
| OPERATOR | | ProviderName | | Nokia | |
| URL | | HomepageURL | | http://www.fi/wap.html | |
| LANG.TAG | | LanguageBaseAttributeIDlist | | EN | |

FIG. 5

AUTOMATIC AND DYNAMIC SERVICE INFORMATION DELIVERY FROM SERVICE PROVIDERS TO DATA TERMINALS IN AN ACCESS POINT NETWORK

FIELD OF THE INVENTION

The present invention relates to service information delivery and more particularly, to dynamically providing mapped service information to data terminals over an access point network.

BACKGROUND OF THE INVENTION

In a typical access point network, when a user of a mobile data terminal wants to use a network service such as a network printer via his data terminal, it is necessary for him to first install a driver corresponding to the service onto the data terminal. In addition, the user must detect information related to the service such as an IP address before being able to use the service. These time consuming configuration processes are typically done manually by the user or by a network administrator. Likewise, in dynamic networks where services are constantly being added and removed, a network administrator must be employed to maintain and reconfigure the network. As a result, a user must wait until the network is reconfigured before he can take advantage of newly offered network services.

Recently, various IP-level service discovery protocols (SDPs) have been developed that enable users to obtain access to network services automatically without requiring the user or network administrator to install a driver and search for the IP address of the desired service. Examples of such SDPs include Service Location Protocol (SLP) by Internet Engineering Task Force (IETF), Bluetooth SDP by Bluetooth SIG, JINI by SUN Microsystems, Universal Plug and Play (UPnP) by Microsoft, or Salutation by Salutation Consortium. Although these SDPs may offer some kind of automatic service updates, they are nevertheless incompatible with each other, absent additional configuration by a network administrator or a user, and are not capable of providing service information to a wireless data terminal user communicating in a wireless short range access point network.

Thus, there is a need for a mechanism that enables IP-level SDPs to communicate with one other and permits wireless data terminal users to obtain access to network services automatically, without requiring any additional network configuration.

SUMMARY OF THE INVENTION

The present invention overcomes the foregoing and other problems encountered in the known teachings by providing a system and method for dynamically updating service information from a service provider to a data terminal in an access point network. Advantageously, the system and method maps service information of an existing service discovery protocol (SDP) to a Bluetooth SDP, thereby alleviating the need for additional configuration by either a user of a data terminal or a network administrator. Further, the system and method automatically advertises the mapped service information to the user. In this manner, the user is automatically informed of additional network services including services offered from service providers outside the access point network. In addition, access points within the access point network may be grouped into separate access zones, whereby access points within an access zone may only receive service information intended for their access zone.

In one embodiment of the system and method of the present invention, an access point requests service information from a local server; in response, the access point receives service information from the local server. Subsequently, the access point maps the service information to a link-level communication SDP. The access point then sends the mapped service information to a data terminal.

In an embodiment directed to a computer program product comprising a computer useable medium having computer program logic recorded thereon for dynamically updating service information from a service provider to a data terminal in an access point network, an exemplary computer program logic comprises: program code for requesting service information from a local server; program code for receiving service information from the local server; program code for mapping the service information to a Bluetooth SDP; and program code for sending the mapped service information to a data terminal.

In an alternate embodiment directed to an access point for dynamically updating service information from a service provider to a data terminal in an access point network, an access point comprises: at least one communication module to communicate with data terminals over a short range wireless communication link; a memory device storing a program; and a processor in communication with the memory device, the processor operative with the program to: request service information from a local server; receive service information from the local server; map the service information to a Bluetooth SDP; and send the mapped service information to a data terminal.

In another embodiment an access point network comprises: a local server for providing service information from a service provider to an access point; and an access point for routing service information received from the local server to a data terminal, wherein the service information is mapped from a first SDP to a Bluetooth SDP.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the invention.

FIG. 4 illustrates an exemplary service record listing corresponding to the delivery of service information in accordance with one embodiment of the present invention using IP-level Service Location Protocol (SLP);

FIG. 5 illustrates an exemplary mapping of IP-level SLP service information to link-level Bluetooth Service Discovery Protocol (SDP) service information in accordance with one embodiment of the present invention.

DETAILED DESCRIPTION

In the following description of the various embodiments, reference is made to the accompanying drawings which form a part hereof, and which show by way of illustration various embodiments in which the invention may be practiced. It is to be understood that other embodiments may be utilized and structural and functional modifications may be made without departing from the scope of the present invention.

Figure 1:
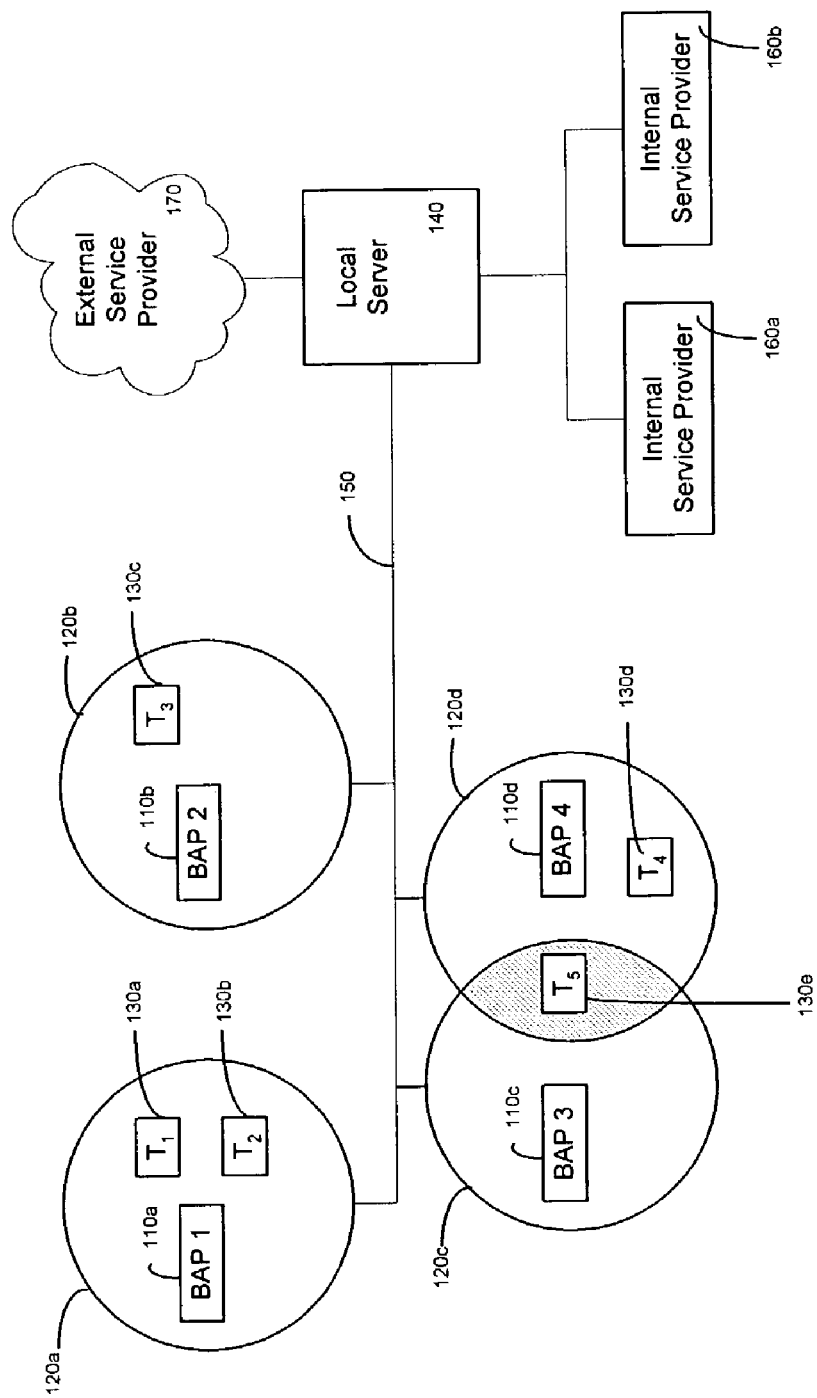
FIG. 1 illustrates a representative arrangement employing the principles of one embodiment of the present invention.

FIG. 1 illustrates a representative arrangement employing the principles of one embodiment of the present invention. As shown in FIG. 1, an access point network 100 includes a plurality of wireless short range access points, such as Bluetooth access points 110a-d, each having a radio frequency coverage area 120a-d for communicating with Bluetooth enabled data terminals 130a-e. Bluetooth is a wireless technology that operates in the unlicensed Industrial, Scientific, and Medical (ISM) radio band of 2.4 GHz, which includes a number of protocols such as Bluetooth Service Discovery Protocol (SDP) that allow Bluetooth enabled devices to operate in a peer-to-peer environment. Each data terminal 130a-e is located within a coverage area 120a-d of at least one access point 110a-d and, if situated at a point where coverage areas overlap, may be located within the coverage areas of a plurality of access points simultaneously (as in the case of data terminal 130e, in areas 120c and 120d).

Data terminals 130a-e may be portable electronic devices such as cellular telephones, personal digital assistants (PDAs), laptop computers, printers or the like equipped with wireless communication capabilities. The data terminals 130a-e may also be fixed electronic devices such as desktop computers or other electronic equipment found in a home or office such as, evolved refrigerators, microwave ovens, television sets, or stereo equipment having wireless communication capabilities.

As further shown in FIG. 1, each access point 110a-d is coupled to a local server 140 via a local area network (LAN) 150 using a data transmission protocol such as TCP/IP. In alternative embodiments, each access point 110a-d may be coupled to the local server 140 directly via a wireless short range communication link such as, for example, a Bluetooth link, or indirectly via one or more intervening access point(s). The local server 140 may be located remotely from all of the access points 110a-d as shown in FIG. 1 or, instead, may be located within one of the access points 110a-d. The local server 140 is additionally coupled to internal service providers 160a-b and to an external service provider 170. The local server 140 may be coupled to the internal service providers 160a-b or a single internal service provider directly via a wireless short range communication link such as, for example, a Bluetooth link. The local server 140 may also be coupled to the external service provider 170 via an external network interface. The internal service providers 160a-b may be located either outside the access point 110a-d's coverage areas 120a-d as shown in FIG. 1, or inside an access point's coverage area.

The internal service providers 160a-b and external service provider 170 shown in FIG. 1 may be mobile electronic devices such as cellular telephones, PDAs, laptop computers, printers or the like, equipped with wireless communication capabilities. Service providers (160a-b, 170) may also be fixed electronic devices such as desktop computers or other electronic equipment found in a home or office such as, evolved refrigerators, microwave ovens, television sets, or stereo equipment having wireless communication capabilities. External service provider 170 may also be a service provided via an external network such as a corporate LAN or the internet.

As will be discussed in detail hereinafter in connection with FIGS. 4-6, in accordance with one embodiment of the present invention, access point 110a requests service information from the local server 140, which then transmits the service information to the access point 110a using an SDP. The service information provided by the local server 140 may include details pertaining to a service such as the service's URL link or its access zone scope. The access point 110a subsequently maps the IP-level service information to a link-level Bluetooth SDP usable by data terminals 130a-b, located in access point 110a's coverage area 120a. The access point 110a will then send an advertisement, which may be, for example, a broadcast of the service's availability, to the data terminals 130a-b, which upon receipt will then be able to utilize the service.

Figure 2:
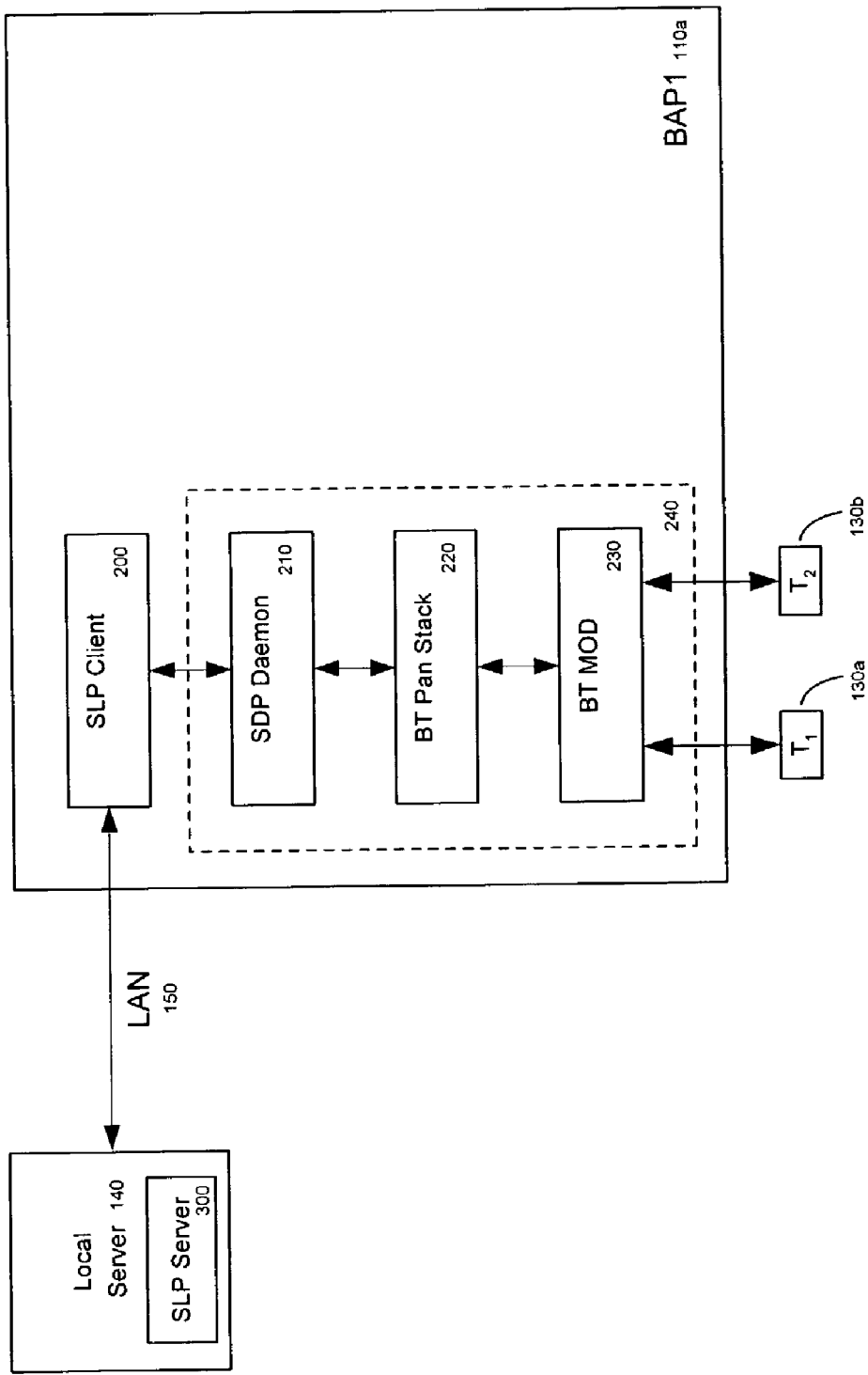
FIG. 2 illustrates an exemplary wireless short range access point in accordance with one embodiment of the present invention.

FIG. 2 illustrates an exemplary wireless short range access point, such as a Bluetooth access point in accordance with one embodiment of the present invention. As shown in FIG. 2, access point 110a includes a Bluetooth Stack 240 including, a Bluetooth SDP daemon 210, a Bluetooth Personal Area Network (PAN) stack 220, and at least one Bluetooth Module 230 for establishing connections with data terminals 130a-b located within Bluetooth module 230's coverage area.

In accordance with one embodiment of the present invention, access point 110a also includes a service information client, such as a Service Location Protocol (SLP) client 200 for tracking information concerning services available via the SLP server 300 disposed in the local server 140. SLP is a TCP/IP based protocol by the Internet Engineering Task Force (IETF) that provides automatic client configuration for applications and advertisements for network services. Additional details concerning the SLP protocol are described in the "SLPv2" draft standard available at www.srvloc.org, a copy of which is incorporated herein by reference. SLP client 200 performs a variety of tracking functions such as adding new service information to the Bluetooth SDP daemon 210 based on service attributes such as a service's access zone. Thus, for example, the SLP client 200 may only add service information for services available within its access zone. In other embodiments, however, the SLP client 200 may add service information for services available to other access zones. Once added to the daemon 210, the service information may then be advertised to data terminals 130a-b within access point 110a's coverage area 120a by broadcasting a signal indicating the service's availability. The SLP client 200 also removes service information, thereby preventing advertising of a service, from the Bluetooth SDP daemon 210 based on attributes such as service expiration.

As will be discussed in detail hereinafter in connection with FIGS. 4-6, Bluetooth SDP daemon 210 stores service information transmitted to it from the SLP client 200 and maps service information from a first SDP to a Bluetooth SDP, thereby facilitating automatic updating of network service information without the assistance of a network administrator. Bluetooth SDP daemon 210 employs technology described in the "Specification of the Bluetooth System" available at www.Bluetooth.com, a copy of which is incorporated herein by reference.

Figure 3:
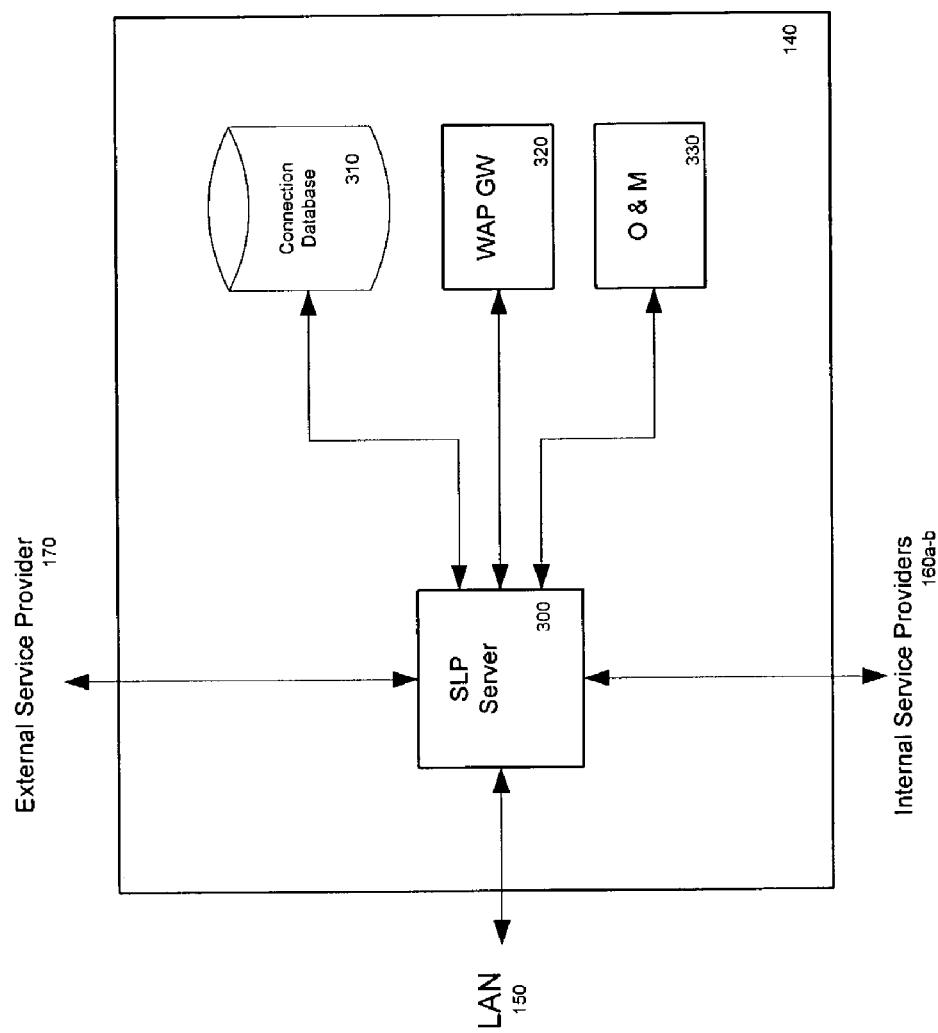
FIG. 3 illustrates an exemplary local server in accordance with one embodiment of the present invention.

FIG. 3 illustrates an exemplary local server in accordance with one embodiment of the present invention. As shown in FIG. 3, local server 140 includes a service information server, such as an SLP server 300 corresponding to SLP client 200 of the access point 110*a*, a connection database 310 that may be implemented as an external database as shown in FIG. 3 or alternatively integrated within the SLP server 300 itself, a wireless application protocol (WAP) gateway 320, and an operations and management (O&M) unit 330. SLP server 300 receives service information from service providers (160*a-b,* 170) and, based on predetermined criteria defined by O&M 330 and service information stored in connection database 310, determines which access points 110*a-d* or data terminals 130*a-e* should have access to service information. Like the SLP client 200 found in access point 110*a,* SLP server 300 also utilizes Service Location Protocol. WAP gateway 320 is additionally provided to allow WAP enabled data terminals such as a cellular phone or PDA, etc., to have internet access. The WAP protocol is described in detail in the "WAP 2.0 Specification" available at www.wapforum.org, a copy of which is herein incorporated by reference.

In addition to storing service information for services provided by service providers (160*a-b,* 170), such as records of services, service lifetimes, etc., connection database 310 may also include general information such as records of data terminals 130*a-e* located in access point network 100. Such records may include, for example, the Bluetooth addresses and device classes for data terminals 130*a-e.* Moreover, storing such information for the entire access point network 100 at a central location facilitates providing it to third-parties such as O&M 330 for uses such as removing services, adding services or restricting services from particular access points 110*a-d,* etc.

FIG. 4 illustrates an exemplary service record listing corresponding to the delivery of service information in accordance with one embodiment of the present invention using IP-level SLP protocol. It is to be understood that other suitable protocols may be applicable such as Salutation, Jini, UPnP or the like. As shown in FIG. 4, service record listing 400, which is contained in connection database 310, includes various records generated during the process of service information delivery such as service information for Registered Services 410 and 420, Service Request 430, Service Reply 440, Service Attribute Request 450, and Service Attribute Response 460. Registered Services 410 and 420 represent services that are available in access point network 100. For each requested service (410, 420), service record listing 400 includes fields for service information such as URL fields for identifying the internet address of each service, LIFETIME fields for identifying the lifetime of each service, SCOPE-LIST fields for identifying the access zone in which each service is to be provided, LANG.TAG fields for identifying the language to be employed by each service and ATTRIBUTES fields for identifying the attributes associated with each service. It will be appreciated that any number of fields may be provided to characterize any number of Registered Services such as fields for restricting the use of services to specific data terminals and fields for identifying the name of the service.

More particularly, Registered Service 410 provides a URL link (i.e., http://www.fi/wap.html) to a WAP over Bluetooth (WoB) service for permitting WAP based communication between Bluetooth enabled data terminals. Registered Service 410 has a LIFETIME of 100 time units, a SCOPE-LIST of access zone 1, a LANG.TAG of English and ATTRIBUTES including a DESCRIPTION of the type of service to be provided (e.g., WAP service), the service's Wireless Application Protocol Gateway IP (WAPGWIP) address (e.g., 10.0.0.1), the service's NAME (e.g., WoB) and the service's OPERATOR (e.g., Nokia).

With respect to Registered Service 420, that service provides a URL link (i.e., lpr://www.fi/printer) to a printer for permitting use of the printer. As shown in FIG. 4, Registered Service 420 has a LIFETIME of 1000 time units, a SCOPE-LIST of access zone 2, a LANG.TAG of Finnish and ATTRIBUTES including a DESCRIPTION of the service to be provided (e.g., color printing), a device NAME (e.g., HP laser jet) and a service OPERATOR (e.g., Nokia).

As further shown in FIG. 4, service record listing 400 includes a Service Request 430 that was received at the SLP server 300 from an SLP client 200. Request 430 indicates in a SCOPE-LIST field that it is a request for a list of services available in access zone 1. Request 430 may include additional fields such as one indicating that it is a request for a list of services available to certain data terminals. In response, SLP server 300 provides SLP client 200 with a Service Reply 440, which includes a URL link and a LIFETIME for the service provided by Registered Service 410 for access zone 1. Upon receipt of Service Reply 440, the SLP client 200 determines whether the link was previously provided to the SDP daemon 210. If not previously provided to daemon 210, SLP client 200 sends a Service Attribute Request 450 to the SLP server 300, the Request 450 includes a URL field identifying the service for which attributes are requested, a SCOPE-LIST field identifying the access zone to which the attributes are to be sent, and a TAG-LIST of attributes to be included in a Service Attribute Response 460. In response, the SLP server 300 transmits a Service Attribute Response 460 to the SLP client 200, which is then added to the SDP daemon 210. Service Attribute Response 460 comprises an ATTRIBUTES field for the service information corresponding to the TAG-LIST in Service Attribute Request 450. As will be discussed hereinafter in connection with FIG. 5, the SDP daemon 210 maps the IP-level service information to a link-level Bluetooth SDP and subsequently advertises the Bluetooth SDP to data terminals 130*a-b* in access point network 100.

FIG. 5 illustrates an exemplary mapping of IP-level SLP service information to link-level Bluetooth SDP service information in accordance with one embodiment of the present invention. As shown in FIG. 5, SLP service information 500 in the connection database 310 and SDP service information 510 in the SDP daemon 210 both include fields for a service's name, description, offeror of the service, the location from which the service may be obtained and the language in which the service is provided. The fields for the SLP service information 500 are labeled NAME, DESCRIPTION, OPERATOR, URL and LANG.TAG. Similarly, the fields for Bluetooth SDP service information 510 are entitled ServiceName, ServiceDescription, ProviderName, HomepageURL and LanguageBaseAttributeIDList. When SLP service information 500 is received at the SDP daemon 210 via the SLP client 200, daemon 210 performs a one-to-one mapping of the data found in the SLP service information 500 fields into the SDP service information 510 fields, thereby resulting in Mapped SDP service information 520.

In the exemplary mapping illustrated in FIG. 5, the SLP service information 500 received at the SDP daemon 210 is associated with the Registered Service 410 of FIG. 4 and is mapped by daemon 210 into a Bluetooth SDP thereby resulting in the data shown in connection with Mapped SDP 520. More particularly, the data from the SLP service information 500 NAME field (i.e., WoB) is mapped to the SDP service information 510 ServiceName field, the data from the DESCRIPTION field (i.e., WAP service) is mapped to the ServiceDescription field, the data from the OPERATOR field (i.e., Nokia) is mapped to the ProviderName field, the data from URL (i.e., http://www.fi/wap.html) is mapped to the HomepageURL field, and the data from the LANG-.TAG field (i.e., EN) is mapped to the LanguageBaseAttributeIDList field.

The above described mapping enables the Bluetooth SDP daemon 210 to advertise the SLP service information 500 using a Bluetooth SDP which is then discoverable by data terminals 130a-b disposed in communication with Bluetooth module 230. It will be appreciated that any number of SLP service information fields may be mapped onto the Bluetooth SDP service information fields. Moreover, any number of SDPs may be mapped to Bluetooth SDP in this manner. These protocols may be, for example, JINI, UPnP, Salutation or the like. Moreover, it should be noted that other types of wireless short range communication protocols may be applicable.

Figure 6:
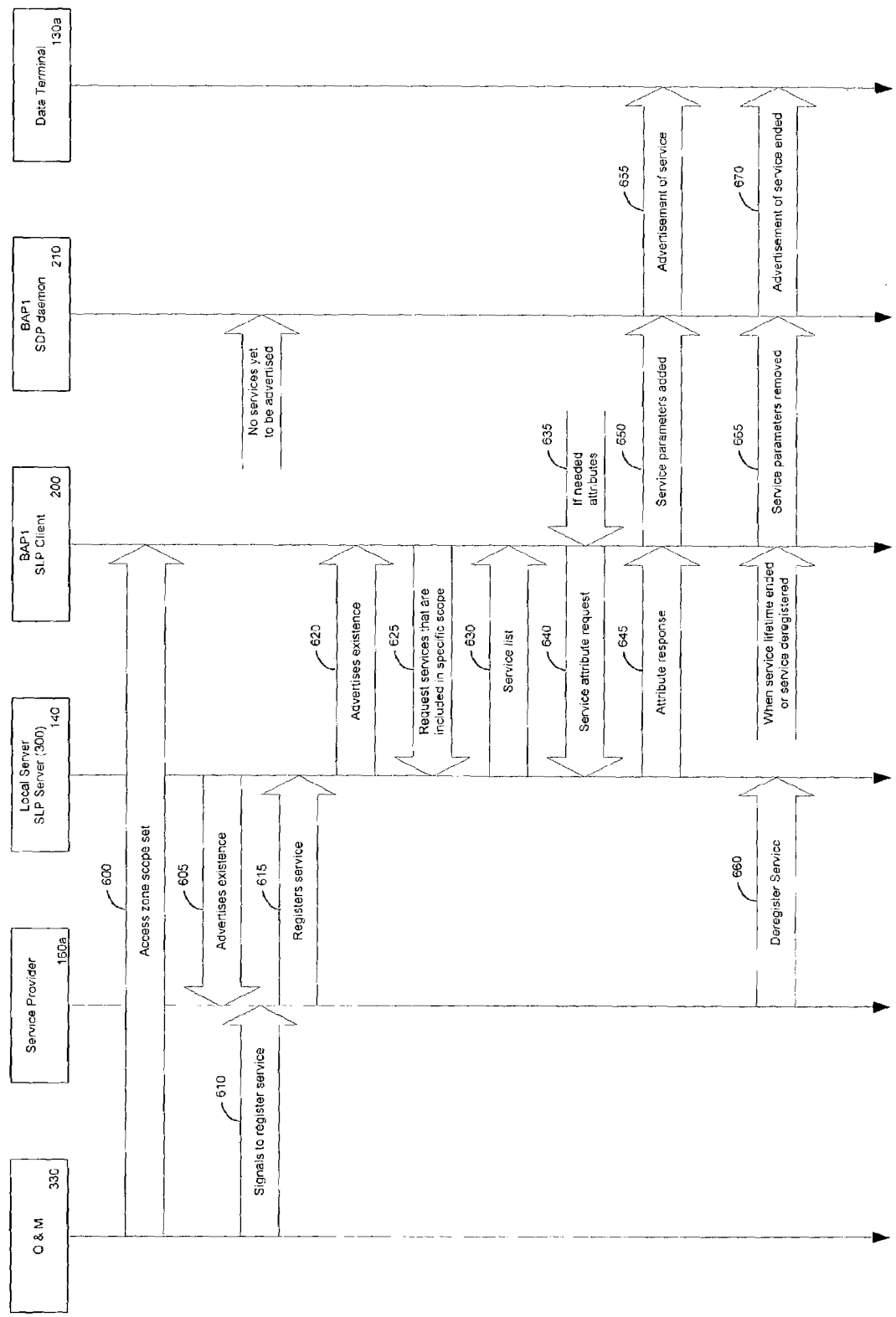
FIG. 6 illustrates an exemplary delivery of service information in accordance with one embodiment of the present invention.

FIG. 6 illustrates an exemplary delivery of service information in accordance with one embodiment of the present invention. As shown in FIG. 6, data terminal 130a is assumed to be within access point 110a's coverage area 120a.

In step 600, O&M 330 sets an access zone scope for access point 110a and accordingly advises the SLP server 300 of local server 140 of that scope. The access zone scope assigned to the access point 110a is an identifier to be used by the local server 140 for restricting or allowing certain services to be used by the access point 110a. The local server 140 then advertises its existence to the internal service provider 160a (step 605). Once the internal service provider 160a becomes aware of the local server 140's existence it may establish communications with the local server 140.

In step 610, O&M 330 instructs internal service provider 160a, which may be, e.g., a facsimile machine supporting SLP, to register a service with local server 140. In step 615 internal service provider 160a registers service information associated with its service with the local server 140. Similarly, the O&M 330 may instruct the external service provider 170 to register its service e.g., internet access, with the local server 140. In step, 620, the local server 140 advertises its existence to the SLP client 200. Once the SLP client 200 becomes aware of the local server 140's existence it may establish communications with the local server 140. In step 625, the SLP client 200 requests a list of services that are provided in its access zone scope. In response, the local server 140 provides a list, such as the one associated with Service Reply 400 shown in FIG. 4, of services that are included in the SLP client 200's scope (step 630).

In step 635, the SLP client 200 determines whether any of the services in the list transmitted by local server 140 have been previously provided to the SDP daemon 210. In this case, however, the list would include service information relating to the facsimile machine. Upon determining that the facsimile machine is a newly offered service, the SLP client 200 sends a Service Attribute Request to the local server 140 (step 640). In response, the local server 140 transmits a Service Attribute Response to the SLP client 200 (step 645), which, in step 650, is then added to the SDP daemon 210. Subsequently, the SDP daemon 210 maps the service information to a Bluetooth SDP and advertises the new service in the Bluetooth SDP to data terminal 130a (step 655). As a result, the data terminal 130a may then access the service of the facsimile machine.

As further shown in FIG. 6, in step 660, the internal service provider 160a may signal local server 140 to deregister its service. This may occur under the instruction of O&M 330 or upon either the temporary or permanent removal of the service from the access point network 100. Alternatively, deregistration may result from the expiration of the time units associated with the service's lifetime. Thus, when the service's lifetime expires or the SLP client 200 receives a signal from, e.g., the local server 140 or O&M 300, to deregister the service, the service is removed from SDP daemon 210 (step 665). Subsequently, in step 670, the advertisement of the service from the SDP daemon 210 to data terminal 130a ends. Thus, precluding the data terminal 130a from using the service, until it receives an advertisement allowing it to use the service again.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A method for updating service information, comprising:
   initiating a request, by an access point, requesting service information that corresponds to an access zone associated with the access point from a local server;
   receiving, at the access point, the service information that corresponds to the access zone associated with the access point from the local server;
   mapping the service information to a link-level communication service discovery protocol for enabling advertisement of the service information in link-level communication; and
   advertising, by the access point, the mapped service information in the link-level service discovery protocol to be discoverable by at least one device in wireless communication with the access point;
   wherein the service information received by the access point includes only service information intended for the access zone the access point is associated with.

2. The method according to claim 1, wherein the local server stores service information from a service provider.

3. The method according to claim 2, wherein the service information corresponds to a service provided by at least one of a personal digital assistant (PDA), a cellular phone, a laptop computer, a desktop computer and a printer.

4. The method according to claim 2, wherein the service information corresponds to an internal service provider.

5. The method according to claim 2, wherein the service information corresponds to an external service provider that provides a service over a data network such as the internet.

6. The method according to claim 1, wherein the service information is mapped to a Bluetooth service discovery protocol.

7. The method according to claim 6, wherein the service information to be mapped to the Bluetooth service discovery protocol includes at least one of a Service Location Protocol (SLP), JINI, Universal Plug and Play (UPnP) and Salutation.

8. The method according to claim 1, wherein the mapped service information is advertised using a Bluetooth communication protocol.

9. The method according to claim 1, further comprising: receiving an advertisement of the local server's existence.

10. The method according to claim 1, further comprising: storing service information received from the local server.

11. The method according to claim 1, further comprising: removing service information received from the local server.

12. The method according to claim 1, wherein the local server is disposed in an access point.

13. A method for updating service information, comprising:
   initiating a request, by an access point, requesting a list of service information that corresponds to an access zone associated with the access point from a local server;
   receiving, at the access point, the list of service information that corresponds to the access zone associated with the access point from the local server;
   requesting attributes for the service information that are not stored in the access point;
   receiving the attributes of the service information;
   mapping the attributes of the service information to a link-level communication service discovery protocol for enabling advertisement of the service information in link-level communication; and
   advertising, by the access point, the mapped service information in the link-level service discovery protocol to be discoverable by at least one device in wireless communication with the access point;
   wherein access points within the access zone only receive the service information intended for the access zone.

14. The method according to claim 13, wherein the local server stores service information from a service provider.

15. The method according to claim 14, wherein the service information corresponds to an internal service provider.

16. The method according to claim 14, wherein the service information corresponds to an external service provider that provides a service over a data network such as the internet.

17. The method according to claim 13, wherein the first service discovery protocol includes at least one of a SLP, JINI, UPnP and Salutation.

18. The method according to claim 13, wherein the service information requested is based on an attribute of the service.

19. The method according to claim 18, wherein the attribute may further include a service lifetime.

20. The method according to claim 13, wherein the service information is restricted based on an attribute.

21. The method according to claim 20, wherein the attribute is at least one of a device type, and a service lifetime.

22. The method according to claim 13, further comprising: removing service information based on the service's attributes.

23. The method according to claim 13, wherein the mapped service information is advertised using a Bluetooth communication protocol.

24. The method according to claim 13, further comprising: receiving an advertisement of the local server's existence.

25. The method according to claim 13, wherein the local server is disposed in an access point.

26. A method, comprising:
   discovering service information advertised by an access point though a link-level service discovery protocol; and
   sending a request, to the access point, to use a service associated with the advertised service information;
   wherein said service information, which corresponds to an access zone associated with the access point, is initially requested by the access point from a local server and mapped from a first service discovery protocol to a link-level communication service discovery protocol for enabling advertisement of the service information in link-level communication;
   wherein access points within the access zone only receive the service information intended for the access zone.

27. The method according to claim 26, wherein the service requested is from at least one of a PDA, a cellular phone, a laptop computer, a desktop computer and a printer.

28. The method according to claim 26, wherein the first service discovery protocol includes at least one of a SLP, JINI, UPnP and Salutation.

29. The method according to claim 26, wherein the service information is advertised using a Bluetooth communication protocol.

30. The method according to claim 26, wherein the request is sent using a Bluetooth communication protocol.

31. An access point, comprising:
   a memory device for storing a program;
   a processor in communication with the memory device, the processor operative with the program to:
   initiate a request for, requesting service information that corresponds to an access zone associated with the access point from a local server;
   receive service information that corresponds to the access zone associated with the access point from the local server;
   map the service information to a link-level communication service discovery protocol for enabling advertisement of the service information in link-level communication; and
   advertise the mapped service information in the link-level service discovery protocol to be discoverable by at least one device in wireless communication with the access point;
   wherein the access point only receives the service information intended for the access zone.

32. The access point of claim 31, wherein the local server stores service information from a service provider.

33. The access point of claim 32, wherein the service information corresponds to an internal service provider.

34. The access point of claim 32, wherein the service information corresponds to an external service provider that provides a service over a data network such as the internet.

35. The access point claim 31, wherein the service information is mapped to a Bluetooth service discovery protocol.

36. The access point claim 35, wherein the service information to be mapped to the Bluetooth service discovery protocol includes at least one of an SLP, JINI, UPnP and Salutation.

37. The access point of claim 31, wherein the mapped service information is advertised using a Bluetooth communication protocol.

38. The access point claim 31, wherein the processor is further operative with the program to:

receive an advertisement of the local server's existence.

39. The access point claim 31, wherein the processor is further operative with the program to:

store service information received from the local server.

40. The access point claim 31, wherein the processor is further operative with the program to:

remove service information received from the local server.

41. The access point claim 31, wherein the local server is disposed in the access point.

42. A computer program product recorded on a computer-readable medium, the computer program product comprising:

program code for initiating a request, by an access point, requesting service information that corresponds to an access zone associated with the access point from a local server;

program code for receiving, at the access point, only the service information that corresponds to the access zone associated with the access point from the local server;

program code for mapping the service information to a link-level communication service discovery protocol for enabling advertisement of the service information in link-level communication; and program code for advertising the mapped service information in the link-level service discovery protocol to be discoverable by at least one device in wireless communication with the access point.

43. An access point, comprising:

at least one communication module to communicate with devices over a short range wireless communication link;

a memory device storing a program; and a processor in communication with the memory device, the processor operative with the program to:

initiate a request, requesting service information that corresponds to an access zone associated with the access point from a local server;

receive the service information that corresponds to the access zone associated with the access point from the local server;

map the service information to a link-level communication service discovery protocol for enabling advertisement of the service information in link-level communication; and advertise the mapped service information in the link-level service discovery protocol to be discoverable by at least one device in wireless communication with the access point;

wherein the access point only receives the service information intended for the access zone.

44. An access point network, comprising:

a local server; and at least one access point configured to initiate a request requesting service information from the local server;

wherein the at least one access point comprises:

at least one communication module to communicate with devices over a short range wireless communication link;

a memory device storing a program; and a processor in communication with the memory device, the processor operative with the program to:

initiate a request, requesting service information that corresponds to an access zone associate with the at least one access point from a local server;

receive the service information that corresponds to the access zone associate with the access point from the local server;

map the service information to a link-level communication service discovery protocol for enabling advertisement of the service information link-level communication; and advertise the mapped service information in the link-level service discovery protocol to be discoverable by at least one device in wireless communication with the access point;

wherein said local server provides the service information from a service provider to the at least one access point; and wherein the at least access point only receive the service information intended for the access zone.

* * * * *